United States Patent Office 3,415,754
Patented Dec. 10, 1968

3,415,754
CORROSION INHIBITORS
Ludo K. Frevel, Midland, Mich., assignor to The Dow Chemical Company, Midland, Mich., a corporation of Delaware
No Drawing. Filed Feb. 28, 1966, Ser. No. 530,407
8 Claims. (Cl. 252—147)

ABSTRACT OF THE DISCLOSURE

The corrosive attack upon stainless steel by an aqueous sulfate solution containing $H_2SO_4$, a bisulfate, or a mixture thereof, at a concentration level in the range of 0.3 to 3 normal is markedly reduced upon adding to the solution from about 0.25 to 30 moles of vanadyl sulfate or uranyl sulfate or mixtures thereof per mole of $H_2SO_4$ and/or bisulfate. The inhibitory effect is marked, even at temperatures as high as 170° C. and over extended periods of time.

---

This invention relates to compositions and methods for inhibiting the corrosion of stainless steels, and more particularly pertains to compositions and methods for protecting nickel and chromium-containing stainless steels against the corrosive effects of hot sulfuric acid and acid salts thereof by adding vanadyl or uranyl sulfate or a mixture of the two to aqueous sulfuric acid or an acid salt of the acid.

There are many chemical processes which require high concentrations of hydrogen ions where aqueous sulfuric acid or acid bisulfates are very effective as a catalyst. Among the reactions in which sulfuric acid is useful are hydrolysis, esterification, certain condensations and hydration of olefins. These reactions are accelerated considerably by heat. However, hot sulfuric acid is extremely corrosive to most metals. Those metals which are corrosion-resistant to hot aqueous sulfuric acid and bisulfates are very expensive, so that they are used only to a very limited extent in reactors. Among such metals are tantalum and gold.

The non-metals which can be used as construction materials for use with hot sulfuric acid or bisulfates are glass, glass-lined or impervious carbon-lined reactors or pipe.

The shortcomings of glass and glass-lined chemical equipment include brittleness, such that damage or breakage can readily occur through relatively slight mechanical shock, the low resistance to heat shock which can also develop cracks, and the low coefficient of expansion as compared to metals, which results in strains in the glass on repeated cycles of heating and cooling. These shortcomings require rigid inspection and maintenance controls on such equipment.

Impervious carbon lining is not completely satisfactory, because hot sulfuric acid has a deleterious effect on the organic binder and on the carbon itself, which can be gradually oxidized to volatile carbon oxides. In the process of oxidation, the surfaces which come into contact with the hot sulfuric acid become pitted and difficult to maintain in a state of cleanliness that is needed for many chemical reactions where contaminants are to be avoided as much as possible.

Chromium-nickel stainless steels have many admirable qualities, but they are susceptible to corrosion by hot aqueous sulfuric acid.

I have found that if vanadyl sulfate or uranyl sulfate or a mixture thereof is added to aqueous sulfuric acid in a molar ratio of from about 0.25 to about 30 moles of the salt per mole of $H_2SO_4$ or acid salt of the sulfuric acid, the corrosion rate of stainless steel is reduced, markedly, even at temperatures as high as 170° C. for extended periods of time.

An advantage of this invention is that it is possible to employ stainless steel as a material of construction for reaction systems using aqueous sulfuric acid or bisulfates as an ingredient.

The examples which follow are intended to illustrate but not to limit the invention. In all instances, parts and percentages are by weight unless otherwise specifically indicated.

Example 1

A solution of 3 molar $VOSO_4$ in 0.9 molar aqueous $NaHSO_4$ was added to a series of glass tubes. Test samples 3″ long, 1″ wide and ⅛″ thick of stainless steels were prepared. One sample of the metal under test is submerged in the test solution and another sample of the same metal was suspended above the solution to check the corrosive effects of the vapors. A reflux condenser was connected to each tube and the solution in the tube was heated to its boiling temperature. Each sample was tested for 30 days under reflux conditions at atmospheric pressure.

The compositions of the metals and their corrosion rates in these tests are tabulated below.

TABLE I

| Sample No.: | Composition | | | | | | | | Corrosion rate (In./Month×10⁻³) | |
|---|---|---|---|---|---|---|---|---|---|---|
| | Mo | Ni | Cr | Mn | Cu | Si | Nb, Ta | Fe | Liquid | Vapor |
| 1 | 3 | 24 | 20 | 1 | | 3.5 | | (1) | .125 | .062 |
| 2 | 2 | 29 | 20 | | 4 | 1 | | (1) | .029 | .033 |
| 3 | 3 | 29 | 20 | .75 | 3 | 1 | .6 | (1) | .075 | .022 |

¹ Balance.

Example 2

A series of corrosion tests on three different stainless steel compositions was conducted in sealed glass ampules at temperatures of 140–170° C. for 1 day to 6.7 days, in an aqueous $H_2SO_4$ solution containing $VOSO_4$. The results of these tests are tabulated below in Table II.

TABLE II

| Stainless Steel | Temp., ° C. | $H_2SO_4$ Normality | $VOSO_4$ Molar Conc. | Corrosion Rate In./Mon.×10⁻³ |
|---|---|---|---|---|
| 316 | 140 | .33 | 2.44 | .08 |
| 316 | 170 | .44 | 2.76 | .54 |
| 316 | 170 | 2.81 | 2.76 | 4.05 |
| 304 | 140 | .33 | 2.44 | .77 |
| 347 | 140 | .33 | 2.44 | .141 |

None of the corrosion rates are so high as to preclude the construction of reactors for use with the aqueous test solutions at the temperatures indicated.

Example 3

To an ampule containing 20 ml. of 3 N $H_2SO_4$ and 6 g. $VOSO_4 \cdot 2H_2O$ was added a piece of 316 stainless tubing with an O.D. of ⅛ inch, I.D. of ⅙ inch, and weighing 1.0890 g. The ampule was heated for 9 days at 160° C. After the test, the tubing weighed 1.0009 g. This is equivalent to a corrosion rate of $2.8 \times 10^{-3}$ in. per month.

For comparative purposes, a piece of the same stainless steel tubing 1⅛ inches long was placed in 20 ml. 3 N $H_2SO_4$ in a test tube, which was then sealed. The entire sample was dissolved during the test period and $H_2$ was liberated. Similarly, a second ampule was prepared containing 20 ml. 3 N $H_2SO_4$, 1 g. $CuSO_4 \cdot 5H_2O$ and 1.0378 g. of stainless steel tubing. After 9 days at 160° C., only a few slivers (.001 g.) of the tubing remained. During the test period, 400 ml. of $H_2$, measured at 25° C. and 1 atmosphere, were formed.

Example 4

The tests of this example were carried out in sealed ampules at 155–165° C. for 22 days, excepting one day when the temperature was lowered to 130° C. In each case, the ampule contained 20 ml. of 3 N $H_2SO_4$ to which was added a uranyl or vanadyl sulfate in the amounts indicated below. The samples were 316 stainless tubing of the type defined in Example 3. Tabulated below are the solutions used and results obtained.

TABLE III

| Test Solution | Corrosion Rate In./Month×10⁻³ |
| --- | --- |
| 3 N $H_2SO_4$+6.169 g. $UO_2SO_4 \cdot 3H_2O$ | 2.8 |
| 3 N $H_2SO_4$ saturated with $UO_2SO_4 \cdot 3H_2O$ | 1.59 |
| 3 N $H_2SO_4$+6.0229 g. $VOSO_4 \cdot 2H_2O$+.2 g. $CuSO_4 \cdot 5H_2O$ | 4.7 |
| 3 N $H_2SO_4$ saturated with $VOSO_4 \cdot 2H_2O$ | 2.46 |

These data show that the addition of copper sulfate to the solution did not affect the protective action of vanadyl sulfate materially.

Although the examples show the use of the uranyl and vanadyl sulfates individually as corrosion inhibitors, they are also effective for this purpose in mixtures in any proportion up to their respective saturation concentrations in the aqueous sulfuric acid or bisulfate salt.

I claim:
1. An aqueous acidic solution, substantially non-corrosive to stainless steel and in contact therewith, consisting essentially of water and a compound selected from the group consisting of $H_2SO_4$, a bisulfate or mixtures thereof and at least one inhibitor of the class consisting of uranyl sulfate, vanadyl sulfate and mixtures thereof, the concentration of said $H_2SO_4$, bisulfate or mixture thereof being from 0.3 to 3 normal and the amount of inhibitor being from about 0.25 to about 30 moles per mole of said compound.

2. The aqueous acidic solution as in claim 1 in which the compound is $H_2SO_4$ and the inhibitor is vanadyl sulfate.

3. In a method in which an aqueous solution from the class consisting of a solution of $H_2SO_4$, a solution of a bisulfate and a solution of a mixture thereof is used in contact with a stainless steel surface, the concentration of said solution being in the range of from 0.3 to 3 normal, the improvement which consists in:
modifying said aqueous solution so that it contains a small but corrosion inhibiting amount of at least one inhibitor selected from the group consisting of uranyl sulfate, vanadyl sulfate and mixtures thereof.

4. The method as in claim 3 in which the amount of inhibitor ranges from about 0.25 to about 30 moles per mole of $H_2SO_4$ or bisulfate.

5. The method as in claim 3 in which the solution is a solution of $H_2SO_4$.

6. The method as in claim 3 in which the stainless steel contains from about 18 to 20 percent by weight nickel, about 8 to 14 percent chromium and the remainder substantially iron.

7. The method as in claim 5 in which vanadyl sulfate is employed in substantially saturating amount.

8. The method as in claim 5 in which uranyl sulfate is employed in substantially saturating amount.

References Cited

UNITED STATES PATENTS

| 2,513,131 | 6/1950 | Baer | 252—147 XR |
| 3,280,038 | 10/1966 | Morris | 252—101 XR |
| 3,316,179 | 4/1967 | Hoornstra et al. | 252—79.2 XR |

MAYER WEINBLATT, *Primary Examiner.*

U.S. Cl. X.R.

252—100, 101, 79.2, 142, 387